United States Patent [19]

Henry et al.

[11] Patent Number: 4,703,907

[45] Date of Patent: Nov. 3, 1987

[54] MECHANISM FOR THE AUTOMATIC EXTENSION OF AN APPENDAGE OF A SPACE VEHICLE PERFORMING A ROTARY MOVEMENT ON ITSELF

[75] Inventors: Jean-Pierre Henry, Valbonne; Lionel Pelenc, Pegomas, both of France

[73] Assignee: Aerospatiale Société Nationale Industrielle, Paris, France

[21] Appl. No.: 927,083

[22] Filed: Nov. 5, 1986

[51] Int. Cl.$^4$ .............................................. B64G 1/44
[52] U.S. Cl. .................................. 244/173; 160/193; 74/64
[58] Field of Search .................... 244/158 R, 173, 159; 160/188, 193; 74/63, 64

[56] References Cited

U.S. PATENT DOCUMENTS

| | | | |
|---|---|---|---|
| 2,548,042 | 4/1951 | Mosher | 160/193 |
| 3,224,491 | 12/1965 | Hamilton | 160/188 |
| 3,363,474 | 1/1968 | Ritter . | |
| 3,525,483 | 8/1970 | Van Alstyne . | |
| 3,557,738 | 1/1971 | Hanssen | 160/193 |
| 3,863,870 | 2/1975 | Andrews et al. . | |

FOREIGN PATENT DOCUMENTS

| | | |
|---|---|---|
| 0064917 | 11/1982 | European Pat. Off. . |
| 2717426 | 11/1978 | Fed. Rep. of Germany . |
| 1030268 | 6/1953 | France . |
| 2088280 | 1/1972 | France . |
| 2371342 | 6/1978 | France . |

OTHER PUBLICATIONS

Aircraft Engineering, vol. 56, No. 1, Jan. 1984 pp. 2-5, Londres, GB; H. Kellermeier et al.

*Primary Examiner*—Galen Barefoot

[57] ABSTRACT

The extension mechanism acts on each of the panels of the appendage, in such a way that the distance separating the center of gravity of said appendage from the rotation axis O of the space vehicle permanently increases from the initial position in which the panels are folded back to the final position where these panels are completely extended. Use is made of cables which are wound onto pulleys, in such a way that there winding radius about the articulation axis of the intermediate panels permanently increases and there winding radius about the articulation axis of the external panel permanently decreases from said initial position to said final position, in accordance with an analytically determined geometrical law.

6 Claims, 7 Drawing Figures

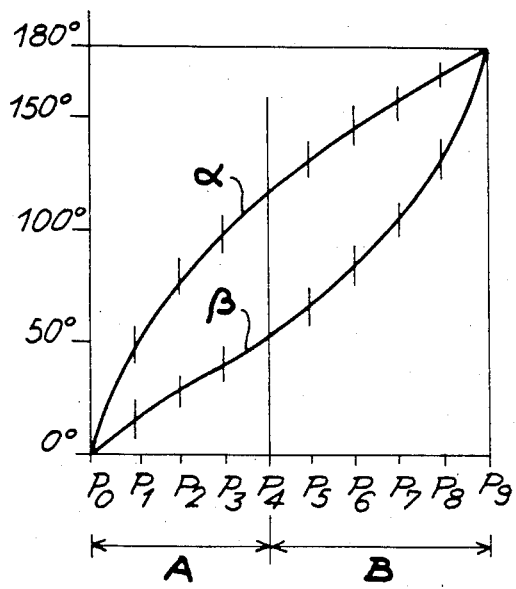
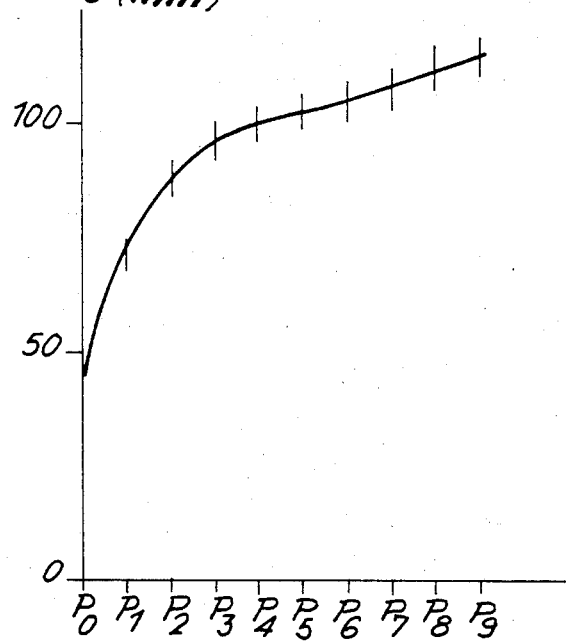

MECHANISM FOR THE AUTOMATIC EXTENSION OF AN APPENDAGE OF A SPACE VEHICLE PERFORMING A ROTARY MOVEMENT ON ITSELF

BACKGROUND OF THE INVENTION

The present invention relates to a mechanism making it possible to automatically open out or extend an appendage, such as a solar panel, on a space vehicle, more particularly constituted by a satellite performing a rotary movement on itself.

The placing into orbit of an artificial satellite about the earth takes place in several stages. Thus, in the case of a geostationary satellite, the latter is generally placed on a low quasi-circular orbit at the time of its launch and the altitude thereof is e.g. approximately 200 km. It is only subsequently transferred to its final orbit, which is in this case constituted by a quasi-circular geostationary orbit at approximately 36,000 km from the earth.

The passage from the low orbit to the geostationary orbit takes place during a so-called transfer phase. The latter firstly comprises so-called perigee operations, during which the satellite passes from the low to an elliptical transfer orbit, whose perigee is located on the geostationary orbit to be reached. The passage from the elliptical transfer orbit to the geostationary orbit takes place during apogee operations constituting the second part of the transfer phase.

During this transfer phase and particularly during the apogee operations, the satellite is subject to high mechanical stressing. However, the existing mechanisms for extending solar panels generally incorporate control means and structures which it would be too constraining to dimension in order to withstand such mechanical stresses if extension took place during the transfer phase. Therefore these mechanisms are only intended to operate following the placing of the satellite in the geostationary orbit.

During the transfer phase, the operational satellite equipment is generally in the standby state or is out of operation. However, certain vital members for the survival and monitoring of the satellite requiring electrical energy must be able to operate. It is therefore necessary to have a certain electrical energy or power quantity during this transfer phase.

Moreover, the transfer phase can last a relatively long time, because it can involve the passage through several elliptical transfer orbits, whose unitary duration is approximately 10 hours. Thus, the electric power cannot exclusively be provided by secondary electricity sources, such as the chemical batteries equipping the satellite, because this would lead to excessive weight and overall dimensions.

In the case of an artificial satellite stabilized according to three axes during the transfer phase, French patent application No. 2 505 288 of the present Applicant proposes solving this problem by effecting the extension of the solar panels as soon as the perigee operation has been completed.

However, in certain cases of satellites spinning during the transfer phase, i.e. a satellite performing a rotary movement about its own axis during this phase and which can e.g. be the longitudinal axis of the satellite, the solution proposed by the aforementioned specification is unsatisfactory. Thus, the electrical energy supplied by the opening out of a single panel of each of the wing or fin members may then be inadequate. In this case, it is consequently necessary to increase the surface of the solar cells exposed during the transfer phase.

SUMMARY OF THE INVENTION

The present invention specifically relates to a novel extension mechanism making it possible to effect the complete extension of the solar generators during the transfer phase of a spinning satellite, without any supply of energy other than the centrifugal force resulting from the rotation of the satellite on itself. The absence of any mechanical device of the torsion bar or spring type for bringing about the opening out of the solar generators makes it possible to eliminate any risk of such devices breaking as a result of the mechanical stresses to which the satellite is exposed during the apogee operations. The complete opening out of the solar generators is consequently ensured.

Thus, the present invention specifically relates to a mechanism for the automatic extension of an appendage fixed to one face of a space vehicle, under the sole effect of a rotation of said vehicle about an axis O, said appendage comprising at least two consecutive articulated panels and having a centre of gravity G, wherein said mechanism acts on each of the panels so as to permanently increase the distance separating the vehicle axis of rotation O from the centre of gravity G of said appendage from an initial position in which the panels are completely folded back, to a final position in which the panels are completely open and aligned with the face of the vehicle to which the appendage is fixed.

In this way and without involving the kinetic energy of the panels, the centre of gravity thereof will be placed in a centrifugal gravity field which, for each position, leads to a supply of energy to the panels in the sense of opening the same.

According to a preferred embodiment of the invention in which the appendage comprises an intermediate panel articulated about a first articulation axis on the space vehicle and an external panel articulated about a second articulation axis on the intermediate panel, the extension mechanism comprising at least one cable wound onto at least two pulleys respectively integral with the space vehicle and the external panel, said pulleys being respectively disposed in the vicinity of said first and second articulation axes, in such a way that the winding radius of the cable about the first articulation axis permanently increases from the said initial position to said final position and the winding radius of the cable about the second articulation axis permanently decreases from said initial position to said final position.

An analytical study of the kinematics reveals that the geometrical proportions must respect certain relationships in order to produce the sought effects.

In a first constructional variant of the invention, the extension mechanism comprises a first pair of circular pulleys integral with the space vehicle and whose axes are disposed symmetrically and in offcentred manner with respect to the first articulation axis, a second pair of circular pulleys integral with the external panel and whose axes are disposed symmetrically and in an offcentred manner with respect to the second articulation axis and two cables wound in reverse directions and fixed to one pulley of each of said first and second pairs.

According to a second constructional variant of the invention, the pulleys have a variable radius and are respectively centered on the first and second articulation axes and in this case the pulleys can in particular be elliptical.

BRIEF DESCRIPTION OF THE DRAWINGS

The invention is described in greater detail hereinafter relative to non-limitative embodiments and the attached drawings, wherein show:

FIG. 5, a curve showing the variations of the angles $\alpha$ and $\beta$ respectively formed between the intermediate panel and the satellite and between the external panel and the intermediate panel for different positions of the solar generator during its extension.

FIG. 6, a curve showing the evolution of the distance OG between the satellite rotation axis O and the solar generator gravity centre G for different positions of said panel during its opening out.

DETAILED DESCRIPTION OF THE PREFERRED EMBODIMENTS

Figure 1:
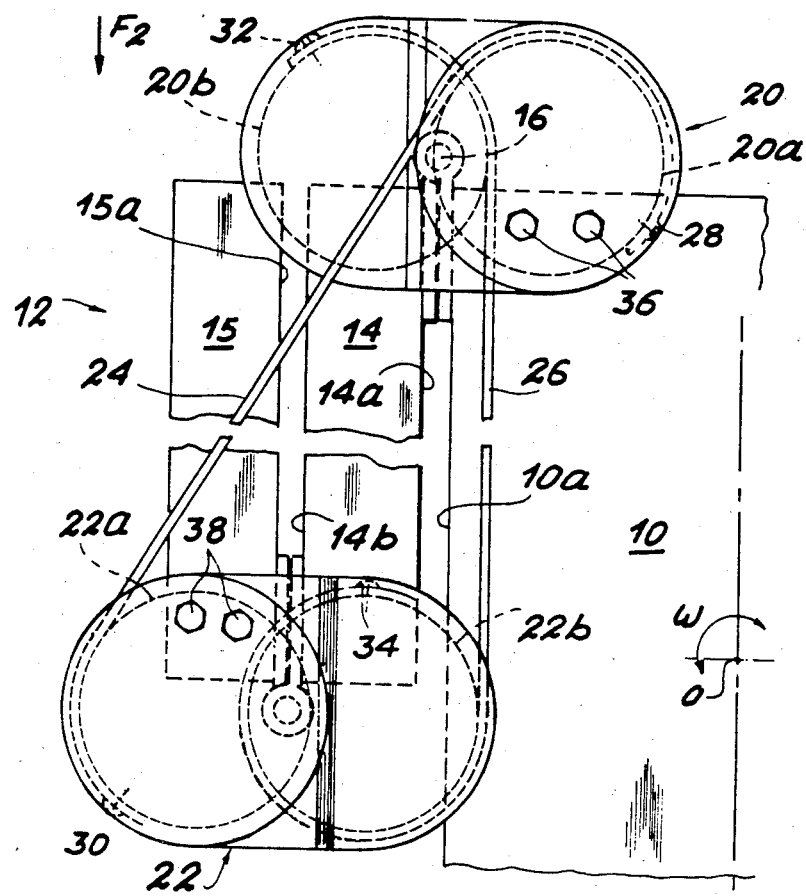
FIG. 1, diagrammatically in side view part of an artificial satellite carrying a solar generator fin formed from two panels and equipped with an extension mechanism according to the invention, the solar generator fin occupying its initial folded back position.
Figure 2:
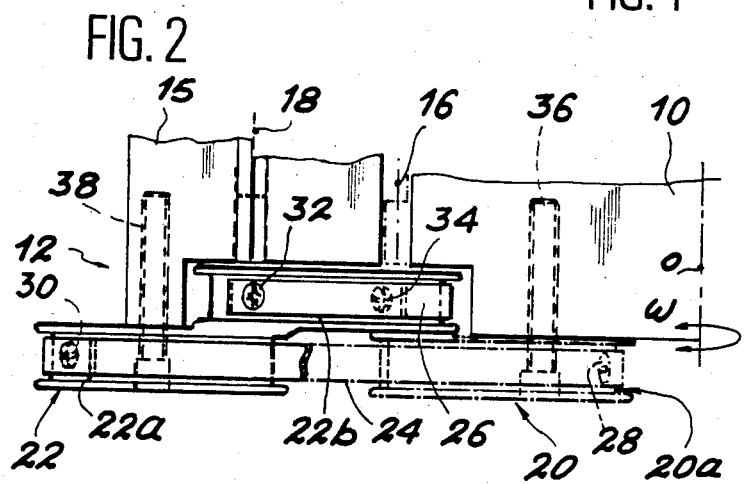
FIG. 2, a view according to arrow F2 in FIG. 1.
Figure 3:
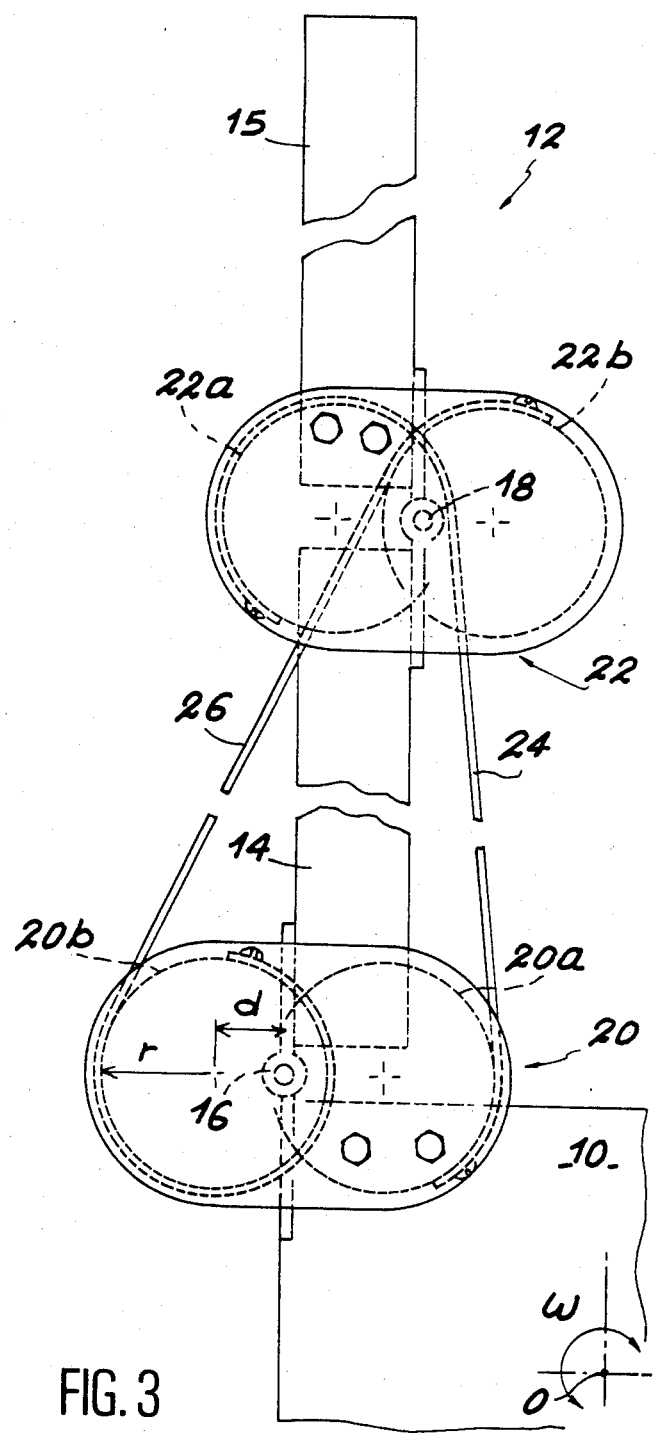
FIG. 3, a view comparable to FIG. 1 showing the position occupied by the solar generator at the end of its extension.

FIGS. 1 to 3 very diagrammatically and partly show the body 10 of an artificial satellite. In known manner, two or three solar generators are articulated on the satellite body 10. Only one of the solar generators is shown at 12 in the drawings.

Each of the solar generators 12 comprises at least two consecutive panels articulated so as to be able to occupy a position (FIG. 1) folded back against one face 10a of body 10 during satellite launch and which can then be completely opened out, according to the invention, solely under the action of satellite rotation about its own rotation axis O at the start of the transfer phase (FIG. 3).

In this particular embodiment shown in FIGS. 1 to 3, solar generator 12 comprises two panels 14, 15 of approximately equal length and which will subsequently be called the intermediate panel and the external panel. To facilitate understanding, the ratio between the thickness and length of the panels has been deliberately increased in FIGS. 1 and 3.

The intermediate panel 14 is articulated by one of its ends 2 the satellite body 10 about an axis 16 oriented perpendicular to the satellite rotation axis O. Axis 16 is located at the intersection of the planes containing the face 10a of the satellite body and the facing face 14a of panel 14 and at the end of face 10a, so that panel 14 can pivot by approximately 180° from its folded back position of FIG. 1 up to its completely opened out position in FIG. 3.

In a comparable manner, external panel 15 is articulated by one of its ends to the end of the intermediate panel 14 opposite to axis 16 about an axis 18 parallel to axis 16. Axis 18 is located at the intersection of the planes which contain, during the movement, the face 14b of panel 14 opposite to face 14a and the facing face 15a of panel 15, so that panel 15 can pivot by approximately 180° with respect to panel 14 from its position of FIG. 1, where it is folded back against panel 14 to its completely opened out position in FIG. 3, where it is aligned with panel 14.

In the absence of any mechanism coordinating the extension of solar generator 12, a rotation $\omega$ of the satellite about axis O would have the effect of bringing solar generator 12 into a stable position of minimum potential energy in the field of gravity resulting from said rotation. This stable position would correspond to the position of the panels for which the centre of gravity of the generator is furthest from axis O. It is reached when the panels are opened out in the plane containing both the satellite rotation axis O and the articulation axis 16 of panel 14 on the body of the satellite.

If the solar generator is allowed to reach this stable position, it can only be completely extended by supplying energy, e.g. with the aid of torsion bars or springs, which is not satisfactory when it is wished to effect the extension in the transfer phase.

According to the invention, the solar generator 12 is equipped with an extension mechanism making it possible to control said extension, so that the distance from the satellite rotation axis O to the centre of gravity G of the generator (FIG. 4) increases permanently until the generator is completely extended. Thus, the complete extension position of the solar generator corresponds to a stable position, which can be reached solely under the effect of centrifugal force and without any external energy supply.

Thus, an extension mechanism designed in this way makes it possible to pass from the folded back position shown in FIG. 1 to the extended position in which the panels are completely open and shown in FIG. 3 under the sole effect of a rotation $\omega$, having a random sign, of the satellite about its own axis O in the case of a spinning satellite in the transfer phase. Thus, during this transfer phase, it is possible to use the electric power obtained with the aid of the photovoltaic cells equipping the solar generators of the satellite, without any external energy supply and particularly without any need for energy outside the panel for producing the extension.

In the embodiment shown, the extension mechanism according to the invention is constituted by a group of pulleys and cables, which will now be described.

The mechanism comprises two identical devices designated 20 and 22 located at one end of each of the articulation axes 16 and 18. Each of the devices 20 and 22 is formed from two identical circular pulleys 20a 20b and 22a, 22b. The pulleys forming each of the devices 20 and 22 are joined to one another, in such a way that their axes are separate, parallel to the articulation axis 16, 18 corresponding thereto and positioned symmetrically with respect to said axis.

As is more particularly illustrated by FIG. 2, pulleys 20a, 22a on the one hand and 20b, 22b on the other are positioned in two planes of symmetry perpendicular to the articulation axes 16, 18 and displaced with respect to one another. This arrangement makes it possible to connect pulleys 20a, 22a with the aid of a first cable 24 and connect pulleys 20, 22b with the aid of a second cable 26. The word "cable" here means either a cable, a belt or any other similar device.

More specifically, the ends of cable 24 are respectively fixed at 28 to pulley 20a and at 30 to pulley 22a, so that cable 24 is held taut between the pulleys. Moreover, the winding direction of cable 24 on pulleys 20a, 22a is such that the core of the cable located between the pulleys passes in the vicinity of axis 16 and conversely at a point remote from axis 18 when generator 12 is folded back in the manner illustrated in FIG. 1.

In a comparable manner, the two ends of cable 26 are respectively fixed at 32 and 34 to pulleys 20b and 22b, in such a way that cable 26 is taut between the pulleys. Moreover, the winding direction of cable 26 on pulleys 20b, 22b is such that the cable core located between the pulleys passes in the vicinity of axis 16 and at a point remote from axis 16 in the folded back position shown in FIG. 1.

Furthermore, device 20 is e.g. fixed by means of screws 36 to the satellite body 10. In the same way, device 22 is fixed e.g. by means of screws 38 to the external panel 15.

In the extension mechanism described hereinbefore, cables 24 and 26 form opposing cables, whose winding on the offcentred pulleys constituting devices 20, 22 make it possible, under the effect of the centrifugal force resulting from the rotation ω of the satellite about axis O, to control the extension of the solar generator 12, in order that the distance OG between axis O and the centre of gravity G of said generator permanently increases from the folded back position of FIG. 1 to the completely opened out position of FIG. 3. This evolution of the distance OG during the extension of the solar generator is obtained by means of the construction of devices 20, 22, which is such that the distance separating the cores of cables 24, 26 located between these devices from axis 16 permanently increases, whereas the distance separating said same cable cores from axis 18 permanently decreases from the folded back position to the completely opened out position of the generator. These distances between the cable cores and axes 16, 18 will subsequently be called the "winding radii" of the cables about said axes.

Figure 4:
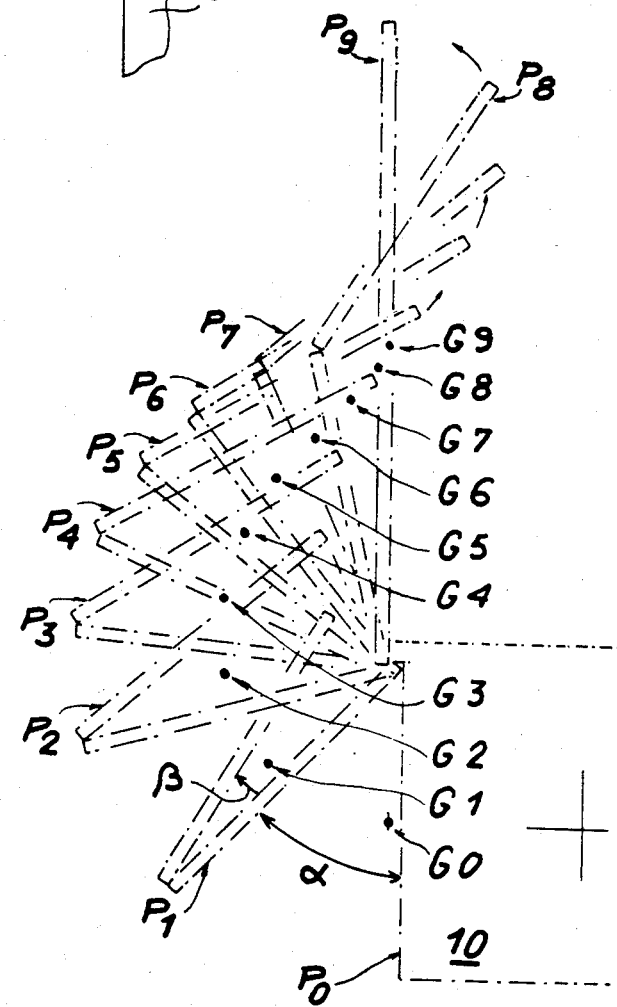
FIG. 4, diagrammatically illustrates the displacement of the centre of gravity G of the solar generator of FIGS. 1 to 3 for different positions thereof during its opening out.

FIG. 4 diagrammatically shows different positions occupied by the solar generator during its extension. These positions are designated by the references $P_0$ to $P_9$, position $P_0$ corresponding to the initial position of FIG. 1 in which the panels are completely folded back, whereas position $P_9$ corresponds to the final complete extension position shown in FIG. 3. The position of the centre of gravity G of the generator in positions $P_0$ to $P_9$ is designated by the references $G_0$ to $G_9$.

As is more particularly illustrated by the curves of FIG. 5 during a first extension phase A of generator 12, the angle α formed between panel 14 and face 10a of body 10 increases more rapidly that the angle β formed between panels 14 and 15. This is due to the fact that during said first phase A, the winding radius of cables 24, 26 about the articulation axis 16 of panel 14 on the satellite body is less than the winding radius of the cables about the articulation axis 18 of the external panel 14 on intermediate panel 15. The situation is reversed in the second phase B of the opening out of solar generator 12, which explains why angle β then increases more rapidly than angle α.

As a result of this control on the effect of the centrifugal force respectively on angles α and β obtained through the extension mechanism according to the invention, the distance OG separating the rotation axis O of the satellite on itself from the centre of gravity G of the solar generator 12 permanently increases from the initial position $P_0$ of FIG. 1, where the panels are completely folded back, to the final position $P_9$ shown in FIG. 3, where the panels are completely opened out. This essential characteristic of the invention can clearly be gathered from the curve of FIG. 6 showing the evolution of the distance OD for the different panel positions $P_0$ to $P_9$. It makes it possible to ensure that the complete extension position of the solar generator illustrated in FIG. 3 is reached under the effect of the sole rotation of the satellite on itself.

Rational analysis of the device shows that this property is only acquired when:

$(d\beta/d\alpha)_{final} \geq 4$, which is only obtained when (cf FIG. 3) $d/r \geq 0.6$.

Figure 7:
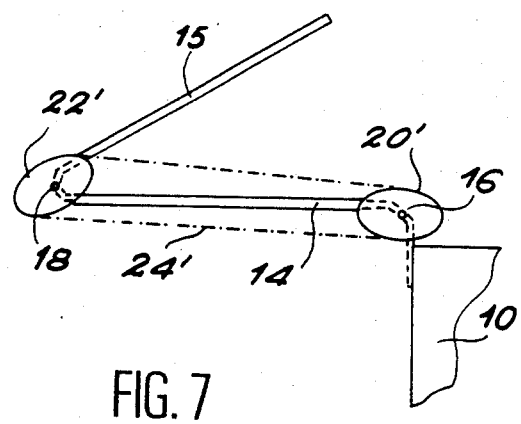
FIG. 7, a diagrammatic side view showing, during the extension, a satellite solar generator equipped with an extension mechanism illustrating a constructional variant of the invention.

Obviously the invention is not limited to the embodiment described in exemplified manner hereinbefore with reference to FIGS. 1 to 3 and in fact covers all variants thereof. In particular and as is very diagrammatically illustrated in FIG. 7, devices 20 and 22 formed from two identical circular pulleys can be replaced by pulleys 20' and 22' respectively centred on the articulation axes 16, 18 of panels 14, 15 and having a variable radius, such as substantially elliptical pulleys. A cable 24' is wound and fixed on pulleys 20', 22' and the two cores thereof located between the pulleys fulfill the same function as the opposing cables 24, 26 in FIGS. 1 to 3. Pulley 20' is fixed to the satellite body 10 in such its minor axis is approximately parallel to the satellite face on which the solar generator is fixed. Pulley 22' is fixed to panel 15 with a major axis parallel to said panel.

Moreover, although the invention is mainly intended for use for bringing about the extension of solar generators on an artificial satellite performing a rotary movement on itself in the transfer phase, it can also apply to the extension of any other articulated appendage on a random space vehicle performing a rotary movement of this type on itself. Finally, it is obvious that the invention can be used no matter what the number of articulated panels constituting the appendage of the space vehicle.

In another not shown embodiment of the invention, the aforementioned extension mechanism is constituted by electromagnetic brake motors, whose operation is programmed to obtain a law β(α) making it possible to limit the control energy in the best possible way. For this purpose, angles and are allowed to evolve in the manner described with reference to FIG. 5, in order that the distance OG permanently increases during the extension of the solar generator.

What is claimed is:

1. A mechanism for the automatic extension of an appendage fixed to one face of a space vehicle, under the sole effect of a rotation of said vehicle about an axis O, said appendage comprising at least two consecutive articulated panels and having a centre of gravity G, wherein said mechanism acts on each of the panels so as to permanently increase the distance separating the vehicle axis of rotation O from the centre of gravity G of said appendage from an initial position in which the panels are completely folded back, to a final position in which the panels are completely open and aligned with the face of the vehicle to which the appendage is fixed.

2. A mechanism according to claim 1, wherein the appendage comprises an intermediate panel articulated about a first articulation axis on the space vehicle and an external panel articulated about a second articulation axis on the intermediate panel, the extension mechanism comprising at least one cable wound onto at least two pulleys respectively integral with the space vehicle and the external panel, said pulleys being respectively disposed in the vicinity of said first and second articulation axes, in such a way that the winding radius of the cable about the first articulation axis permanently increases from the said initial position to said final position and the winding radius of the cable about the second articulation axis permanently decreases from said initial position to said final position.

3. A mechanism according to claim 2, wherein the extension mechanism comprises a first pair of circular pulleys integral with the space vehicle and whose axes are disposed symmetrically and in offcentred manner with respect to the first articulation axis, a second pair of circular pulleys integral with the external panel and whose axes are disposed symmetrically and in an offcentered manner with respect to the second articulation axis and two cables wound in reverse directions and fixed to one pulley of each of said first and second pairs.

4. A mechanism according to claim 2, wherein said pulleys have a variable radius and are respectively centred on the first and second articulation axes.

5. A mechanism according to claim 4, wherein said pulleys are substantially elliptical.

6. A mechanism according to claim 1, wherein it comprises electric brake motors controlling the extension of each of the panels so as to permanently increase the distance OG from the initial position ($P_0$) to the final position ($P_9$).

* * * * *